United States Patent
Cangiani et al.

(10) Patent No.: US 7,239,707 B2
(45) Date of Patent: Jul. 3, 2007

(54) STAGGERED PULSE ACQUISITION METHOD AND APPARATUS

(75) Inventors: Gene L. Cangiani, Parsippany, NJ (US); Peter M. Brodie, Oakland, NJ (US); James M. Clark, Verona, NJ (US); Dennis McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 979 days.

(21) Appl. No.: 09/994,945

(22) Filed: Nov. 28, 2001

(65) Prior Publication Data

US 2003/0048901 A1    Mar. 13, 2003

Related U.S. Application Data

(60) Provisional application No. 60/253,131, filed on Nov. 28, 2000.

(51) Int. Cl.
*H04B 1/69* (2006.01)
*H04L 9/00* (2006.01)
*G08C 19/22* (2006.01)

(52) U.S. Cl. ............... 380/252; 375/137; 375/145; 375/149; 370/515; 341/178

(58) Field of Classification Search .......... None
See application file for complete search history.

(56) References Cited

U.S. PATENT DOCUMENTS

| | | | |
|---|---|---|---|
| 4,049,953 A | 9/1977 | Evans, Jr. | |
| 4,638,357 A | 1/1987 | Heimbach | |
| 4,931,800 A | 6/1990 | Ward | |
| 4,972,431 A * | 11/1990 | Keegan | 375/150 |
| 5,535,278 A | 7/1996 | Cahn et al. | |
| 5,822,429 A | 10/1998 | Casabona et al. | |
| 5,937,000 A * | 8/1999 | Lee et al. | 375/141 |
| 6,411,664 B1 | 6/2002 | Usui et al. | |
| 6,965,634 B1 * | 11/2005 | Clark | 375/150 |

* cited by examiner

*Primary Examiner*—Gilberto Barrón, Jr.
*Assistant Examiner*—Brandon Bludau
(74) *Attorney, Agent, or Firm*—Edell, Shapiro & Finnan, LLC (57) ABSTRACT

A transmitter employing a cryptographic algorithm and key generates and transmits a staggered pulse signal that includes a plurality of high-power pulses that are part of a pseudonoise (PN) code. The high-power pulses are separated by a group of low-power chips and the time interval between the high-power pulses is varied according to the cryptographic algorithm and key. A receiver, employing a corresponding cryptographic algorithm and key receives the signal and correlates it with a locally generated code that is modified according to the cryptographic algorithm and key to detect the phase of the received PN code. The receiver also can include a matched filter configured according to the cryptographic algorithm and key to detect the sequence of high-power pulses in the received signal.

18 Claims, 8 Drawing Sheets

STAGGERED PULSE ACQUISITION METHOD AND APPARATUS

CROSS REFERENCE TO RELATED APPLICATION

This application claims priority from U.S. Provisional Patent Application Ser. No. 60/253,131, entitled "Staggered Pulse Acquisition Method and Apparatus," filed Nov. 28, 2000. The disclosure of that provisional patent application is incorporated by reference here in its entirety.

BACKGROUND OF THE INVENTION

1. Field of the Invention

The present invention relates to data communication systems and, more particularly, to data communication systems transmitting and receiving signals in the presence of unintentional background noise or intentional interference.

2. Description of the Related Art

The ability to detect and acquire low level communications, navigation, or radar signals in the presence of unintentional background noise or intentional interference (jamming) has been and continues to be a critical requirement for numerous military and civilian systems.

Traditional solutions include increasing the transmitted signal power, sometimes adaptively, to allow operation with various levels of interference. One such application is for the next generation of the Global Positioning System (GPS). The military community requires additional anti-jam (A/J) capability for the GPS military signal in theaters or areas of responsibility (AORs) during times of conflict. One proposal that has been submitted to achieve this capability is to configure the GPS satellites with large, steerable dish antennas that can direct high power spot beams into an AOR.

Another solution, for synchronous communications systems, is to increase the signal power in short bursts with duty cycles that are of the order of the reciprocal of the power increase. With this scheme, the average power is not increased and, since the system is synchronous, the receiver can anticipate when the bursts, or pulses, will occur. If the receiver is only trying to acquire the signal during the occurrence of a pulse (or pulses), then the resistance to interference is improved by the amount of the instantaneous power increase.

However, the brute force technique of raising the average power to counteract interference or jamming generally is expensive and is limited by the power resources available at the transmitter. The proposal to increase power in a selected geographical area via spot beams for the next generation of GPS is extremely expensive, in terms of cost, operational complexity, and size, weight and power of the required satellite equipment.

The pulsed power technique discussed above is an elegant solution, but it requires synchronous operation. The receiver must have its internal clock synchronized with the transmitter's clock, in order to be able to anticipate the occurrence of the high power signal pulses. If the receiver cannot predict when the pulses will occur, then the receiver will continuously attempt to acquire the signal. Accordingly, no advantage will be realized from the pulsing technique, because the total signal energy in the receiver's acquisition window will be the same as without pulsing. Also, if the power is pulsed at a regular rate, a jammer can pulse the jamming power at nearly the same rate so that periodically the jamming pulses will synchronize with the signal pulses at the receiver, giving an advantage to the jammer to at least periodically block the signal.

Accordingly, there is a need for a system that increases the signal power in short bursts but that does not require synchronous operation.

SUMMARY OF THE INVENTION

Therefore, in light of the above, and for other reasons that will become apparent when the invention is fully described, an object of the present invention is to extend the pulsed power technique to non-synchronous systems.

Another object is to reduce the power requirements of a transmitter, such as a transmitter in a GPS satellite that transmits a signal such as a GPS signal.

Still another object is to avoid the need to configure satellites transmitting the signal with steerable antennas.

The aforesaid objects are achieved individually and in combination, and it is not intended that the invention be construed as requiring two or more of the objects to be combined unless expressly required by the claims attached hereto.

In accordance with the certain aspects of the invention, high power pulses are staggered in time such that the length of the time intervals between pulses are known to the receiver, so that the receiver can utilize this knowledge to reliably acquire the signal, without time synchronization. The duration of the time intervals between the high power pulses can be cryptographically controlled using a cryptographic key known to both the transmitter and the receiver, so that authorized receivers are given an advantage.

The acquisition strategy for the receiver is to configure the correlators to detect only the high-power portions of the code, ignoring the low-power portions. The tracking strategy is to switch the gain level to follow the anticipated power profile, providing separate weighting of the two components of the received signal. (In a typical receiver, the acquisition mode allows the receiver to discover the correct signal timing, and the tracking mode allows the receiver to follow any drift of the timing.)

The rationale for this strategy is as follows. The tracking portion of a receiver typically needs only a few correlators (generally with on-time, early, and late phases); so that giving some weight even to the low-power portions of the signal can be afforded. However, the acquisition portion of the receiver typically needs as many parallel correlators as can be afforded, to allow searching for the correct timing as quickly as possible. Giving zero weight to (ignoring) the low-power portions of the signal (as illustrated by the bottom half of FIG. 2) reduces the amount of processing, allowing more correlators for the same cost.

The above and still further objects, features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

DETAILED DESCRIPTION

Preferred embodiments according to the present invention are described below with reference to the above drawings, in which like reference numerals designate like components.

Operation

To achieve the advantages of using high-powered pulses without requiring a receiver to operate synchronously with a transmitter, a new signal has been developed. In that new signal, groups of high-power pulses are staggered in time such that the duration of time intervals between the groups of pulses vary and are known to the receiver. This allows the receiver to utilize that knowledge to reliably acquire the signal, without time synchronization. The length of the time intervals between the groups of high power pulses can be cryptographically controlled using a cryptographic key known to both the transmitter and the receiver.

Figure 1:
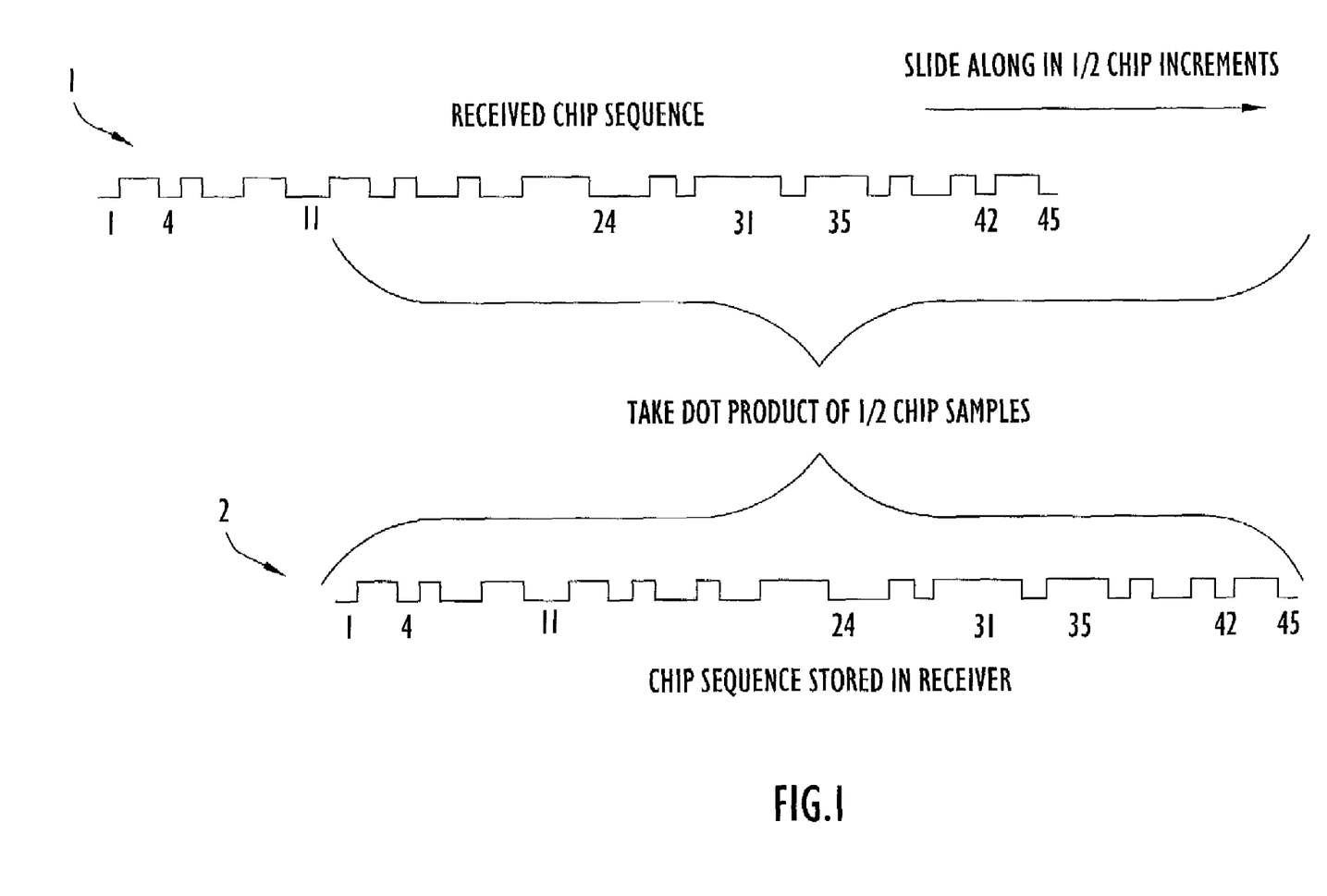
FIG. 1 shows a conventional received signal and operation of a conventional correlation receiver.

For a code division multiple access (CDMA) signal structure, a conventional correlation receiver operates as depicted in FIG. 1. A 45-chip segment of a code 1 that the receiver attempts to acquire is shown in FIG. 1. The code (chip sequence) is stored in the receiver, usually 2 samples per chip, shown in FIG. 1 as code 2. The receiver compares the received signal with the stored code 2. The comparison can be accomplished by correlating the received signal with the stored code 2 by taking the dot product of the stored sequence with a corresponding length of incoming signal. Then, on every succeeding time sample (½ chip), the incoming signal is shifted by one sample and a new dot product is formed. When the shifted incoming signal aligns (within ½ chip) with the stored code 2, the output of the correlator, that is, the value of the dot product, will be much higher than at other times. The amount by which the correlation peak exceeds the non-peak values depends on the length of the correlator and on the correlation properties of the particular code that is being used. The signal is deemed acquired when the correlator output exceeds a pre-determined threshold.

Figure 2:
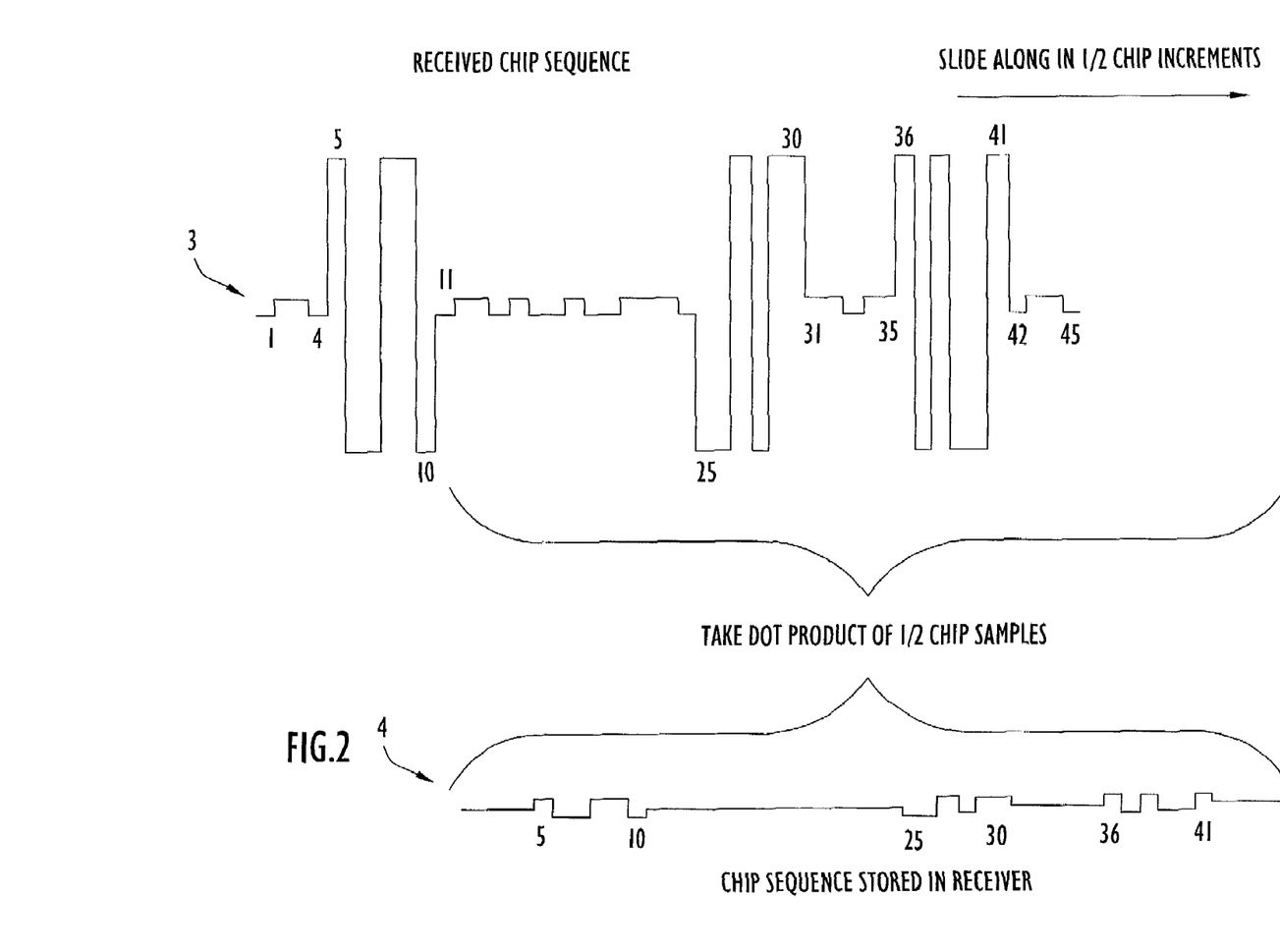
FIG. 2 shows a staggered pulse signal according to aspects of the present invention and operation of a receiver used to acquire the staggered pulse signal.

To illustrate the operation of pulse acquisition according to an aspect of the present invention, consider the same code sequence that was utilized in the above example, with the signal power boosted for short intervals creating pulses that include a plurality of chips with a boosted signal power, as depicted by code 3 in FIG. 2. For example, the amplitude of the pulses can be raised by the inverse of the average duty cycle. Such a technique maintains the same average signal power, although other techniques can be used to boost the signal power.

The chip sequences during the period of high power pulses, as well as the staggered time intervals between the high power pulses, are known to the receiver. For a military application, the inter-pulse intervals and the specific chip sequences could be cryptographically generated and therefore could be reproduced only by authorized users. As depicted in FIG. 2, the receiver compares the received signal containing high power pulses with the stored code 4. The comparison can be accomplished by correlating the received signal with the stored code 4 by taking the dot product of the stored sequence with a corresponding length of incoming signal. Then on every succeeding time sample (½ chip), the incoming signal is shifted by one sample and a new dot product is formed. When the shifted incoming signal aligns (within ½ chip) with the stored code 4, the output of the correlator, that is, the value of the dot product, will be much higher than at other times. Here, unlike the conventional systems, only the chip values that are transmitted with high power participate in the dot product. When the correlation process sums over the high power chips and ignores the low power chips, processing gain and the resultant acquisition performance (interference and jamming immunity) is improved significantly.

Staggered Pulse Transmitter

Figure 3A:
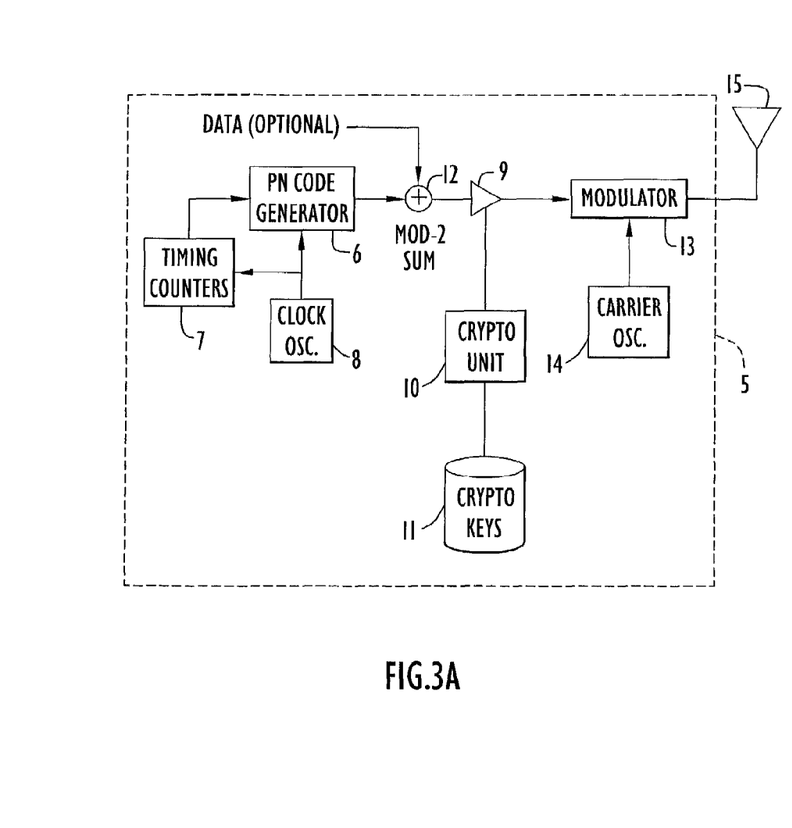
FIGS. 3A and B are block diagrams of exemplary transmitters having an amplifier that boosts certain chips of a pseudonoise (PN) code according to a cryptographic algorithm and outputs a sequence of staggered high-power chips forming a power pulse.

A spread-spectrum communications transmitter 5, such as a transmitter that can be employed in a GPS satellite, is shown in FIG. 3A, configured to produce high power pulses by boosting certain chips in a sequence of chips generated according to a pseudonoise (PN) code. The transmitter of FIG. 3A includes a PN code generator 6 that is controlled by timing counters 7 and both are driven based on a clock oscillator 8. The PN code generator 6 outputs a sequence of chips according to a PN code that the generator is configured to generate. An amplifier 9 boosts the power level of certain chips in the sequence output from the PN code generator 6. A cryptographic unit 10 controls the time interval over which the amplifier operates to boost chips in the PN sequence. The cryptographic unit, using a predetermined cryptographic algorithm and cryptographic keys stored in cryptographic storage unit 11, determines the length of an interval of time between a group of boosted chips. According to the cryptographic algorithm and keys used by the cryptographic unit 10, the cryptographic unit 10 controls the amplifier to boost the power level of the PN code chips above a nominal transmission value for a period of time. After that period of time elapses the cryptographic unit 10 controls the amplifier so that it does not boost the power level for another period of time. The cryptographic unit 10 can determine, based on the cryptographic algorithm and keys in use, the time intervals over which the chips are to be boosted, not boosted.

The output of amplifier 9 is a sequence of PN code chips having groups of sequential chips with a high power level separated by groups of chips with a low power level. For example, FIG. 2 shows an example PN code sequence output from amplifier 9. Here, a first group of PN code chips, numbered 1 through 4, are not boosted. This first group of chips corresponds to an interval of time in which the cryptographic unit 10 controls the amplifier 9 to not boost the power level of the chips. A second group of chips, corresponding to an interval of time in which the cryptographic unit 10 controls the amplifier 9 to boost the power level of the PN code chips, is shown by chip numbers 5 through 10. PN code chips numbered 11 through 24 span a third interval of non-boosted chips. A fourth interval includes boosted chips 25 through 30, and a fifth interval includes non-boosted chips 31 through 35. As can been seen in FIG. 2 the intervals of time for the groups of non-boosted chips vary in length. The variations in length follow a cryptographic pattern according to the cryptographic algorithm and keys in use by the cryptographic unit 10.

Figure 3B:
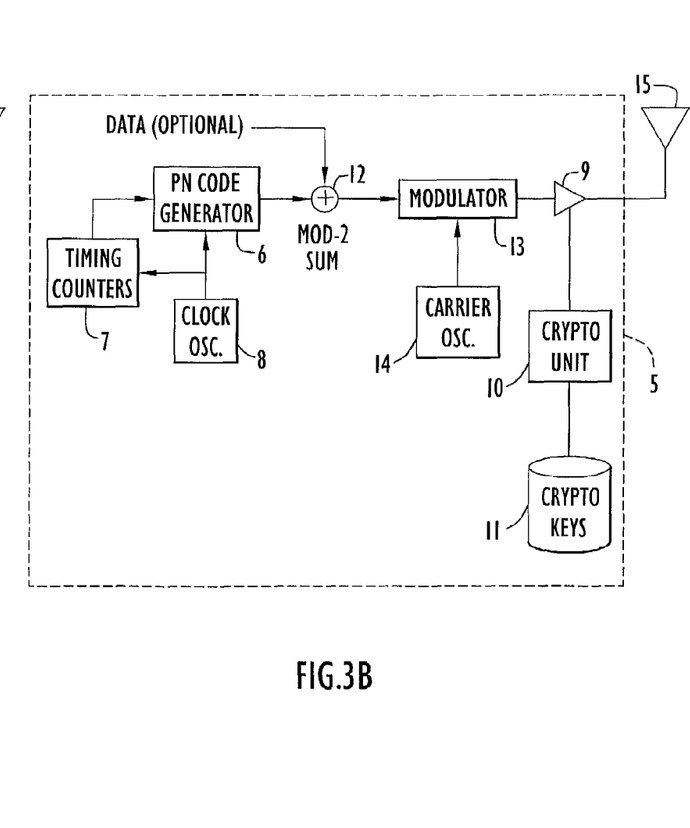

Returning to FIG. 3A, the boosted and non-boosted PN code chips output from amplifier 9 are modulated with a carrier signal via modulator 13 which is driven by carrier oscillator 14. Alternatively, the amplifier 9 can be configured, as shown in FIG. 3B, to receive the output of the modulator 13 and amplify the modulated signal. In this instance the modulator 13 operates on a fixed signal amplitude.

Optionally, data can be superimposed onto the code and carrier by using a modulo 2 adder 12 that adds data to the signal output from PN code generator 6. The transmitter 5 transmits the modulated carrier via antenna 15 thereby outputting a carrier wave modulated to carry the boosted and non-boosted PN code chips. That transmitted signal is intelligible to a receiver that has a computer-controlled correlator for detecting the sequences of high-power PN code chips based on the intervals between the groups of high power chips that follow a cryptographical pattern.

Staggered Pulse Receiver

Note that FIG. 2 shows a functional description of the process of acquiring a staggered pulse signal. It will be appreciated that an ordinarily skilled artisan would understand that there are many efficient ways to implement receiver to acquire such a staggered pulse signal.

A typical receiver has an acquisition mode that enables it to discover the correct signal timing, and a tracking mode that enables it to follow any drift of the timing. Both modes use mostly the same resources of the receiver, except for the correlators. The tracking mode typically needs only a few correlators (generally with on-time, early, and late phases). However, the acquisition mode typically needs as many parallel correlators as can be afforded, to allow searching for the correct timing as quickly as possible.

Figure 4A:
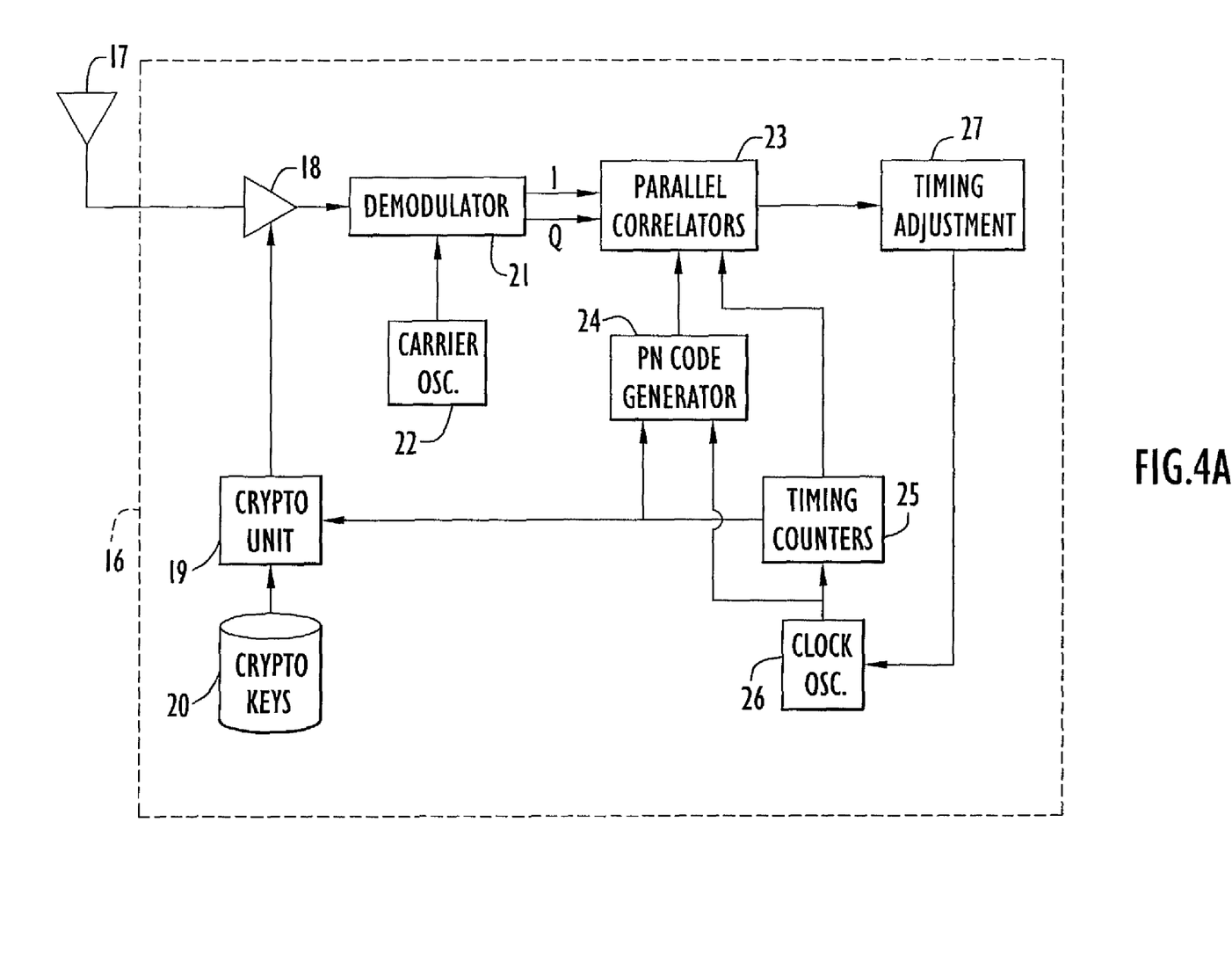
FIG. 4A is a block diagram of an exemplary receiver configured to operate in a tracking mode to track the staggered high-power chips output from the transmitter.

An example of a receiver configured to operate in the tracking mode is shown in FIG. 4A. Here, a receiver 16 receives the transmitted signal via an antenna 17 that provides the received signal to a gain controller 18, such as an amplifier. The gain controller 18 is controlled by a cryptographical unit 19 that is connected to a cryptographical storage unit 20 for storing cryptographical keys. The cryptographical unit 19 and cryptographical storage unit 20 correspond to the cryptographical unit 10 and cryptographical storage unit 11, respectively, of the transmitter. The output of the gain controller 18 is applied to a demodulator 21 that is driven by a carrier oscillator 22, and produces two signals out-of-phase by 90° that are provided to a group of parallel correlators 23. Those two signals are designated as in-phase (I) and quadrature (Q) signals. The parallel correlators can include as many or as few correlators as required to track the incoming signal. Multiple parallel correlators 20 can be used to correlate multiple phases of the signals, such as the early and late phases of the signal.

The parallel correlators 23 are provided with PN reference codes that correspond to the PN codes generated in the transmitter. PN code generator 24 generates the reference codes. The reference codes can be delayed to correspond to the various phases to be tested. Alternatively, the input signals, here the I and Q signals, can be delayed with various delays and correlated with a single PN code to test the different phases.

The PN code generator 24 is driven by a local clock oscillator 25 and timing counters 26 which can produce the different timings for the PN reference codes. The local clock oscillator also drives timing counters 26. The clock oscillator 25 is controlled by an output of a timing adjustment unit 27 that generates a timing adjustment signal based on the output of the correlators 23. For example, the difference of the strength of the early and late correlators can be used to adjust the timing, assuming that the timing error is small.

In the receiver shown in FIG. 4A the cryptographical unit 19 generates a sequence based on an algorithm and a key from the cryptographic storage unit 20 that correspond to the algorithm and key used by the transmitter 5 for use in decoding the sequence of pulses. The tracking mode operation is performed as in a conventional tracking receiver although with a cryptographically controlled gain added as shown in FIG. 4A. It is noted that the time tracking loop is shown in FIG. 4A, but not the carrier tracking loop. The cryptographic unit 19 can also provide inputs to the PN code generator 24 if needed.

Figure 4B:
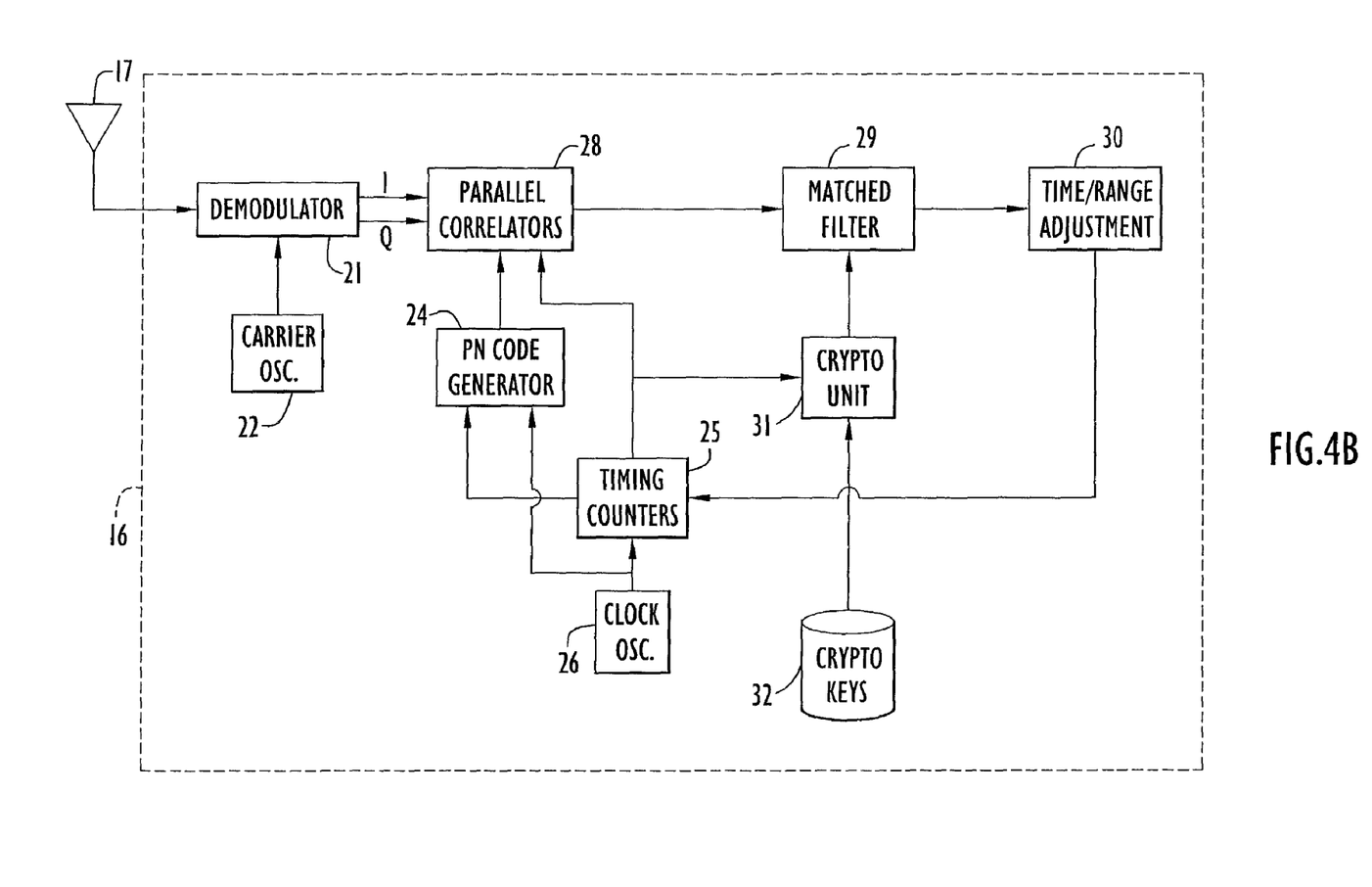
FIG. 4B is a block diagram of another exemplary receiver configured operate in an acquisition mode to receive and acquire code having the staggered high-power chips output from the transmitter.

Since the tracking mode can only handle small timing errors, the receiver must first use the acquisition mode to acquire correct timing. A receiver configured to operate in an acquisition mode is shown in FIG. 4B. Here, many of the same components used for the tracking mode are shown for use in the acquisition mode. However, when operating in an acquisition mode many parallel correlators are used to try many possible timings at the same time. The timing counters are not set correctly, but simply define an initial reference for identifying all of the timing possibilities. Generally one (perhaps two) of the correlators will have nearly correct timing, recognized by having the strongest output(s). When the correct timing is confirmed, the timing counters are set correctly for the tracking mode.

In the acquisition mode, the correlation is performed is two stages. In the first stage, performed by a parallel correlator unit 28, shown in FIG. 4B, that has many correlators for use in acquiring the signal, the signal is correlated over a span of individual power pulses. In the second stage, performed by a matched filter 29, these short correlations are summed, using delays that match the random intervals between the power pulses. In FIG. 4B a cryptographic unit 31, using keys stored in a cryptographic storage unit 32, is connected to the matched filter 29 and is used to set these delays, using the same random values used in the transmitter. The cryptographic unit 31 also can provide inputs to the PN code generator 24 if needed.

Acquisition Strategy

Suppose the receiver's initial time uncertainty is no more than plus or minus 10 seconds. The receiver's acquisition strategy begins by using the same pulse timing as for the transmitter. Given the current time of day plus 10 seconds, the pulse timing, which can be represented as a list of pulse start times, covering a correlation span is generated. The correlation span is the portion of the signal that the receiver will seek to detect. In a similar fashion, the PN subsequences of the code during the pulse intervals indicated by the list of pulse start times is also generated. This data is used to configure the correlator circuits, described below in more detail, preparing it to detect this portion of the signal, which according to the receiver's timing, is 10 seconds in the future.

If the receiver's timing error is 10 seconds late, then the correlator will detect the signal immediately (looking early compensates for its lateness); but if set 10 seconds early, will detect it after searching for 20 seconds. For all errors within the uncertainty range, the signal will be found sometime in the 20-second search.

Correlator Structure

The correlator used to detect a portion of the code repeatedly computes dot products, each one being a dot product of a subsequence of recent signal samples and a subsequence of the code to be detected. The dot product (correlation) becomes large when the two subsequences align and match well. Two types of correlators that can be used in the parallel correlators 23 use different methods of alignment. A matched-filter type of correlator is shown in FIG. 5A and a parallel-active type of correlator is shown in FIG. 5B.

Figure 5A:
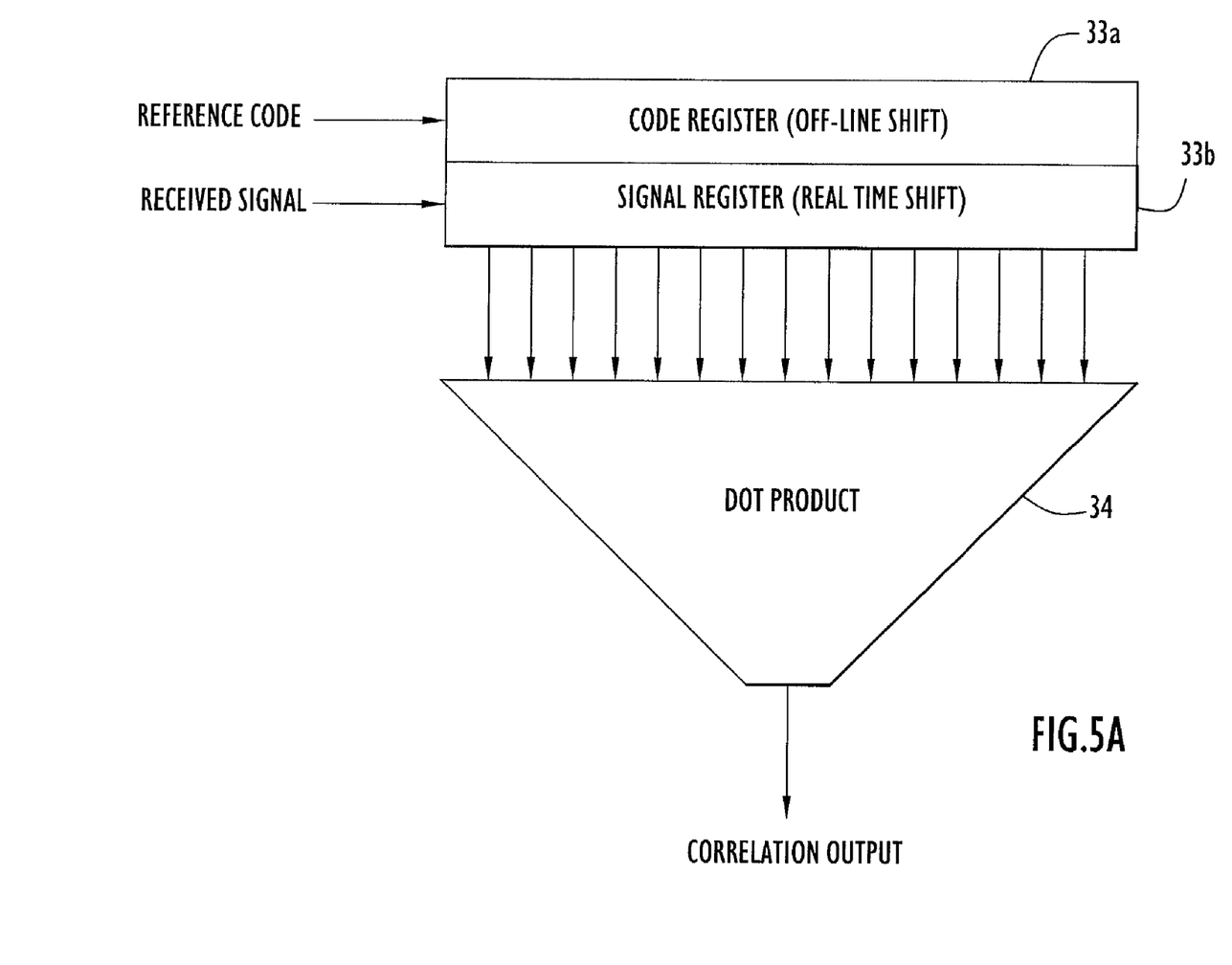
FIG. 5A is a block diagram of a matched-filter style of coherent correlator, correlating over one power pulse.

The matched filter type of correlator shown in FIG. 5A includes a code register 33a that receives a reference code and performs an off-line shift, a signal register 33b that receives the received signal and performs a real-time shift, and a dot product unit 34 that performs a dot product operation on its inputs. The contents of the code and signal registers are input to the dot product unit that performs the dot product operation on the inputs and outputs a correlation result.

Figure 5B:
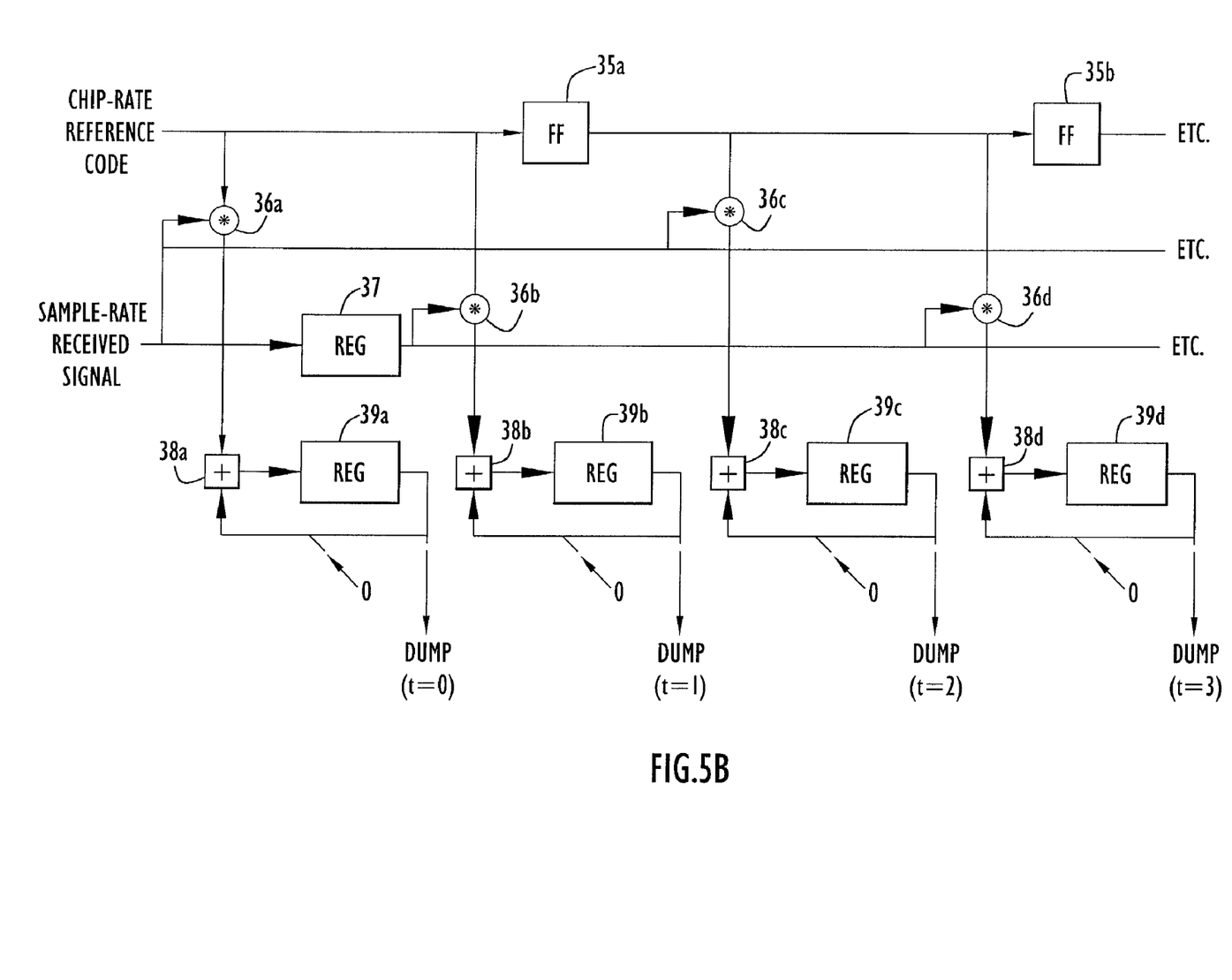
FIG. 5B is a block diagram of a parallel-active style of coherent correlator, correlating over one power pulse.

As shown in FIG. 5B, the parallel-active type of correlator shown in FIG. 5B includes flip-flops 35a and 35b, multipliers 36a through 36d, a register 37, adders 38a through 38d, and registers 39a through 39d that are dumped to produce correlation outputs corresponding to different times (e.g., time t=0, t=1, etc.). Each output circuit includes a register (e.g., register 39a) receiving an input from an adder (e.g., 38a) that adds the output of the register with an output of a multiplier (e.g., multiplier 36a). When the register dumps a "0" is inserted into the adder (e.g., 38a) at the appropriate time to, in essence, reset the accumulation. The multiplier multiplies a received signal at the sample rate with a reference code at the chip rate. The flip-flops delay the reference code or the received signal for an appropriate amount of time for the corresponding correlation result. A multiplexer (not shown) can be used to multiplex the values dumped from the registers at different times.

Detecting a Pulse

To coherently detect one pulse, either type of correlator can be used equal in size to the width of the pulse. For example, to detect one pulse in the staggered pulse signal using the matched filter type correlator the correlator's code register 33a holds as many chips as in the pulse, and signal register 33b holds as many samples as in the pulse. To detect one pulse in the staggered pulse signal using the parallel-active type correlator the correlator's code register (i.e., flip-flops 35a, 35b, etc.) holds as many chips as in the pulse. However, the signal register (i.e., register 37) holds as many samples as in a chip, as opposed to the number of samples in a pulse as in the matched-filter type of correlator. For the parallel-active style correlator, the code register should be rotated after it is initially filled, and each sum dumped and reset after it receives the last chip. In this way, both styles can search for a given pulse for a time equal to the span of the time uncertainty.

Detecting Multiple Code Pulses

To coherently detect multiple randomly spaced pulses, either type of correlator can be used, with the receiver configured with one correlator for each pulse. To noncoherently sum the individual pulse correlations into one stronger correlation, these correlators are strung together with variable-delay memories that are configured with delays matching the random intervals between the pulses. Here, more differences between the correlator styles are noted.

Figure 6A:
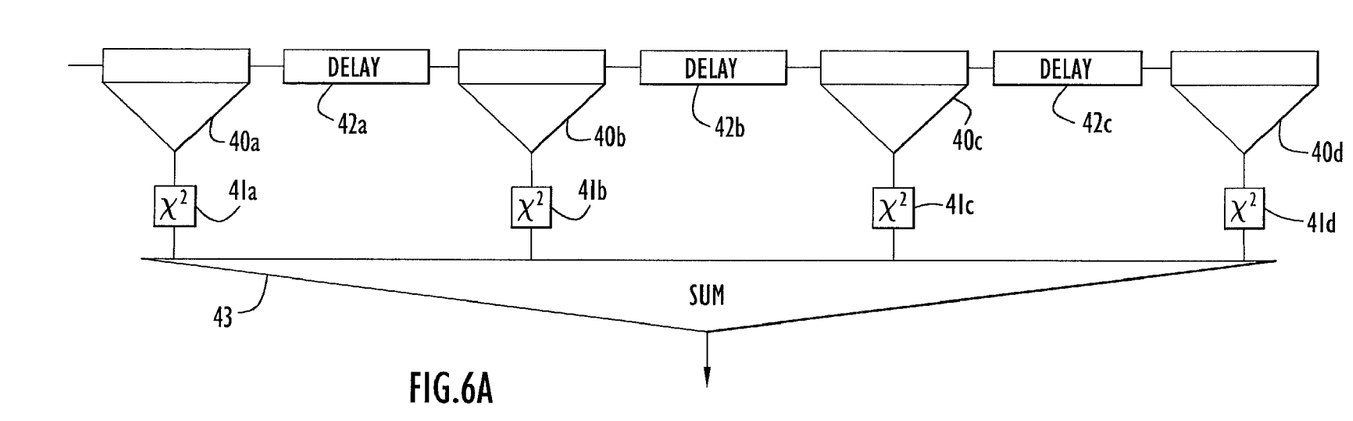
FIG. 6A shows a matched-filter style of a partially coherent correlator which can correlate multiple power pulses. The correlator in FIG. 6A employs a series of the matched-filter style coherent correlators shown in FIG. 5A.
Figure 6B:
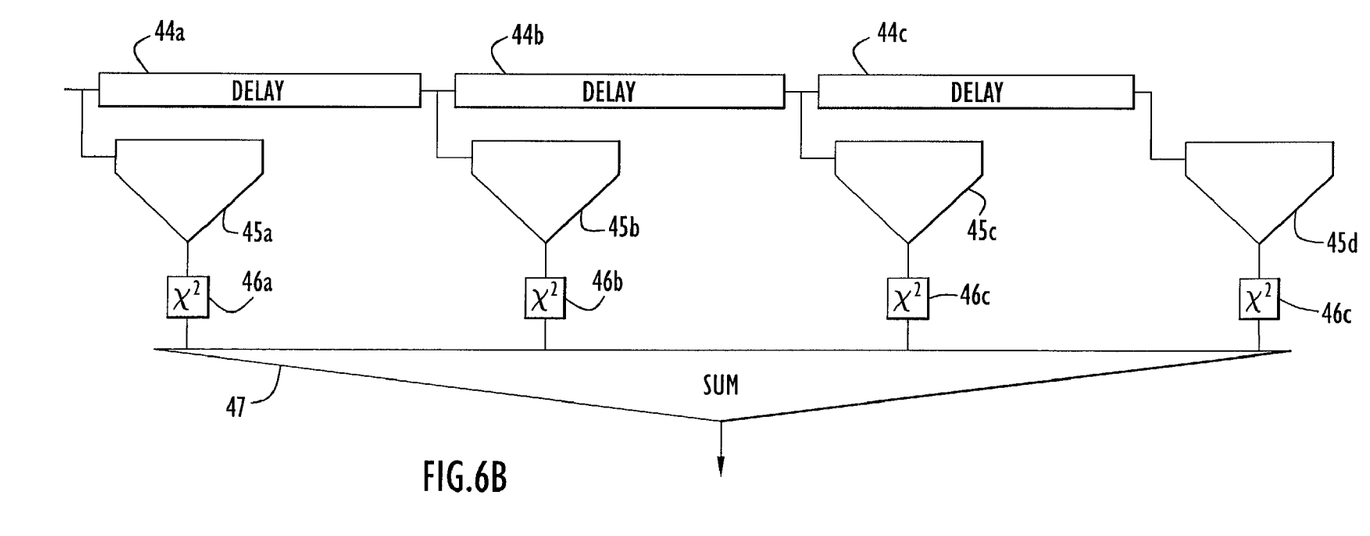
FIG. 6B shows an active-parallel style of a partially coherent correlator which can correlate multiple power pulses. The correlator in FIG. 6B employs a series of the parallel-active style coherent correlators shown in FIG. 5B.

When using the matched-filter correlators, advantage is taken of the fact that the signal register of each pulse-detection correlator delays the signal for the width of the pulse. Variable delays set to the intervals between pulses are used, as illustrated in FIGS. 6A and 6B. FIG. 6A shows a receiver configured with matched-filter correlators for detecting a pulsed code. In FIG. 6A matched-filter correlators 40a through 40d are connected with delay units 42a through 42d disposed between the correlators. For a noncoherent sum of the pulse correlations, the vector outputs of the correlators are squared (to compute $I^2+Q^2$) by squaring units 41a through 41b that square the correlation outputs. The squared correlation outputs are summed using an adder 43 to produce a detection signal. Only the signal path is shown in FIG. 6A.

However, when using the parallel-active type correlators, the signal registers do not have any substantial delay. Each variable delay is set to the interval from the start of one pulse to the start of the next pulse, as shown in FIG. 6B. In FIG. 6B variable delay units 44a through 44c receive the signal and delay it according to their set delay values. Parallel-active type correlators 45c through 45d receive the delayed signal, corresponding the corresponding interval between pulses, and produce a correlation result that can be squared by square units 46a through 46d. The squared correlation results are summed by an adder 47 to produce a detection signal.

It will also be understood that many of the elements shown in the transmitter illustrated in FIGS. 3A-B and the receiver illustrated in FIGS. 4A-B can be implemented in hardware, software or firmware.

APPLICATIONS

A staggered pulse acquisition system is applicable for significantly improving A/J for the military code for the next generation of GPS. It is also generally applicable for improving interference immunity, in general, for spread spectrum communications and radar systems.

Having described embodiments of a staggered pulse signal, and methods and apparatuses for transmitting and receiving such a signal, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of transmitting a signal to a receiver in order to allow the receiver to acquire synchronization to the signal, comprising:
generating a sequence of pseudorandom noise chips according to a pseudorandom noise code to produce a transmit signal;
amplifying the transmit signal during time intervals to produce higher power pulses that are separated in time, wherein time intervals between successive higher power pulses are determined based on a cryptographic sequence and represents synchronization information for said transmit signal; and
transmitting the transmit signal to the receiver to allow the receiver to use knowledge of the cryptographic sequence to acquire synchronization to the signal.

2. A transmitter suitable for transmitting a staggered pulse signal, comprising:
a code generator configured to generate a plurality of pulses according to a code to produce a transmit signal;
a cryptographic unit configured to generate a cryptographic sequence based on a cryptographic key; and
an amplifier connected to the code generator and the cryptographic unit, wherein the amplifier amplifies the transmit signal to a higher level during short bursts of time that are separated in time, wherein time intervals between successive short bursts are determined based on said cryptographic sequence and represents synchronization information for the transmit signal so as to allow a receiver that receives the transmit signal to use knowledge of the cryptographic sequence to acquire synchronization to the transmit signal.

3. The transmitter of claim 2, wherein the code is a pseudorandom noise (PN) code.

4. A transmitter suitable for transmitting a staggered pulse signal, comprising:
code generator means for generating a plurality of pulses according to a code to produce a transmit signal;
means for generating a cryptographic sequence based on a cryptographic key; and
means for amplifying connected to said code generator means and said means for generating, wherein the means for amplifying amplifies the transmit signal to a higher level during short bursts of time that are separated in time, wherein time intervals between successive short bursts are determined based on said cryptographic sequence and represents synchronization information for said signal so as to allow a receiver that receives the transmit signal to use knowledge of the cryptographic sequence to acquire synchronization to transmit signal.

5. The transmitter of claim 4, wherein the code is a pseudorandom noise (PN) code.

6. A receiver for receiving a staggered pulse signal having high-power pulses separated by time intervals according to a cryptographic algorithm, the receiver comprising:
a cryptographic unit configured to generate a cryptographic sequence corresponding to the cryptographic algorithm; and
a code detection unit connected to the cryptographic unit and configured to detect the high-power pulses in the received staggered pulse signal to determine time intervals between bursts of the high-power pulses, wherein the code detection unit uses the cryptographic sequence in order to decode the time intervals between successive bursts of the high-power pulses to acquire synchronization to the staggered pulse signal.

7. The receiver of claim 6, wherein the code detection unit comprises:
a correlator configured to correlate the received signal with a local code and to output a correlation signal; and
a decoder unit configured to decode the correlated signal based on the cryptographic sequence generated by the cryptographic unit.

8. The receiver of claim 7, wherein the decoder unit comprises a matched filter configured to detect time intervals between the high power pulses of the staggered pulse signal to acquire synchronization to the staggered pulse signal.

9. The receiver of claim 8, wherein the cryptographic unit comprises a cryptographic processing unit and a cryptographic storage unit having stored therein cryptographic keys, wherein the cryptographic processing unit generates the cryptographic sequence based on a key stored in the cryptographic storage unit.

10. The receiver of claim 6, wherein the decoder unit uses a pseudorandom noise (PN) code to decode the staggered pulse signal.

11. A receiver for receiving a staggered pulse signal having high-power pulses separated by time intervals according to a cryptographic algorithm, the receiver comprising:
means for generating a cryptographic sequence corresponding to the cryptographic algorithm; and
code detection means for detecting the high-power pulses to determine time intervals between bursts of the high-power pulses, wherein the code detection means uses the cryptographic sequence in order to decode the time intervals between successive bursts of the high-power pulses to acquire synchronization to the staggered pulse signal.

12. The receiver of claim 11, wherein said code detection means comprises:
means for correlating the received signal with a local code and outputting a correlation signal; and
decoder means for decoding the correlated signal based on the generated cryptographic sequence.

13. The receiver of claim 12, wherein said decoder means comprises filter means for detecting time intervals between the high power pulses of the staggered pulse signal.

14. The receiver of claim 11, wherein the code detection means uses a pseudorandom noise (PN) code to decode the staggered pulse signal.

15. A method of transmitting a signal to a receiver in order to allow the receiver to acquire synchronization to the signal, comprising:
generating a sequence of pseudorandom noise chips according to a pseudorandom noise code to produce a transmit signal;
increasing a power level of the transmit signal for short bursts of time that are separated by time intervals determined based on a cryptographic sequence, and wherein the time intervals represents synchronization information for the transmit signal; and
transmitting the transmit signal to the receiver to allow the receiver to use knowledge of the cryptographic sequence to acquire synchronization to the signal.

16. A method for receiving a staggered pulse signal comprising short bursts of higher power, wherein the short bursts are separated by time intervals according to a cryptographic algorithm, comprising:
detecting the short bursts;
determining durations of time intervals between successive short bursts; and acquiring synchronization to the staggered pulse signal based on said durations of said time intervals using knowledge of a cryptographic sequence used to define said time intervals in the staggered pulse signal.

17. A method for communication between a transmitter and an authorized receiver, comprising:

at the transmitter:

generating a pseudorandom noise sequence;

modulating a carrier signal with the pseudorandom noise sequence to produce a modulated signal;

boosting a transmit power during finite length pulses of the modulated signal to produce a transmit signal, wherein each pulse encompasses a plurality of code chips and such that individual pulses have different durations and time interval spacings between them, wherein the durations and time interval spacings are controlled by a cryptographic sequence, known only to the transmitter and to authorized receivers, and represents synchronization information for the transmit signal;

transmitting the transmit signal to the receiver;

at the authorized receiver:

receiving the transmit signal and producing a received signal;

detecting the individual pulses in the received signal;

determining durations of time intervals between successive pulses; and acquiring synchronization to the transmit signal based on the durations of the time intervals using knowledge of said cryptographic sequence used to define said time intervals at the transmitter.

18. A communication system comprising a transmitter and an authorized receiver, wherein the transmitter comprises:

a code generator configured to generate a pseudorandom noise sequence;

a modulator that modulates a carrier signal with the pseudorandom noise sequence to produce a modulated signal;

a cryptographic unit that generates a cryptographic sequence based on a cryptographic key; and an amplifier connected to the modulator and the cryptographic unit, wherein the amplifier amplifies the modulated signal to a higher level during short bursts of time that are separated in time, wherein time intervals between successive short bursts are determined based on said cryptographic sequence known only to the transmitter and to authorized receivers, and represents synchronization information for the transmit signal;

wherein the authorized receiver comprises:

a cryptographic unit that generates a cryptographic sequence that matches the cryptographic sequence used in said transmitter; and a correlator that is configured during an acquisition mode to match only to higher power portions of the sequence having time intervals between higher power bursts based on said cryptographic sequence in order to acquire synchronization to said transmit signal, and said correlator ignoring lower power portions of the sequence until synchronization is acquired, and thereafter switching to a tracking mode whereby said correlator correlates to the entire pseudorandom noise sequence including lower power portions.

* * * * *